(12) United States Patent
Stark

(10) Patent No.: US 9,656,438 B2
(45) Date of Patent: May 23, 2017

(54) UV-IMPERMEABLE AND LIGHT-IMPERMEABLE FILM WITH A HIGH DEGREE OF REFLECTION

(71) Applicant: Buergofol GmbH, Siegenburg (DE)

(72) Inventor: Kurt Stark, Neuhaus a. d. Pegnitz (DE)

(73) Assignee: BUERGOFOL GMBH, Siegenburg (DE)

( * ) Notice: Subject to any disclaimer, the term of this patent is extended or adjusted under 35 U.S.C. 154(b) by 134 days.

(21) Appl. No.: 14/564,652

(22) Filed: Dec. 9, 2014

(65) Prior Publication Data

US 2015/0158265 A1  Jun. 11, 2015

(30) Foreign Application Priority Data

Dec. 9, 2013 (DE) .......................... 10 2013 113 718

(51) Int. Cl.
*B32B 1/08* (2006.01)
*B32B 15/00* (2006.01)
(Continued)

(52) U.S. Cl.
CPC ............... *B32B 1/08* (2013.01); *B32B 15/00* (2013.01); *B32B 27/08* (2013.01); *B32B 27/12* (2013.01);
(Continued)

(58) Field of Classification Search
CPC ............ G02B 1/00; G02B 5/0816; G02B 5/085–5/0875; G02B 5/26; G02B 5/283;
(Continued)

(56) References Cited

U.S. PATENT DOCUMENTS 4,518,524 A * 5/1985 Stoetzer ................... H01B 1/22
252/512
2008/0009214 A1  1/2008 Aigner
(Continued)

FOREIGN PATENT DOCUMENTS

DE   297 00 236 U1   6/1998
DE   198 18 061      11/1999
(Continued)

OTHER PUBLICATIONS

Scheiff GmbH, DE29700236, English Language Machine Translation, Created Jun. 20, 2016.*
(Continued)

*Primary Examiner* — Stephone B Allen
*Assistant Examiner* — Adam W Booher
(74) *Attorney, Agent, or Firm* — Dority & Manning, P.A.

(57) ABSTRACT

A multi-layered film in the form of a hose-shaped outer film for an insert hose of a pipe rehabilitation system includes silver-colored pigments in at least two layers of the film, or a metallization applied on both outer layers of the film, or silver-colored pigments in at least one layer of the film and a metallization is applied on an outer layer of the film. At least one UV absorber is inserted in at least one or several layers of the film of the film. The entire film is permeable to UV light and visible light in a wavelength range from 200 to 800 nm at a rate of less than 0.1%, and is opaque. The UV radiation and visible radiation are reflected in a wavelength range from 200 to 800 nm.

27 Claims, 1 Drawing Sheet

(51) Int. Cl.
*B32B 27/08* (2006.01)
*B32B 27/12* (2006.01)
*B32B 27/20* (2006.01)
*B32B 27/30* (2006.01)
*B32B 27/32* (2006.01)
*B32B 27/34* (2006.01)
*B32B 27/40* (2006.01)
*F16L 55/165* (2006.01)
*G02B 1/00* (2006.01)

(52) U.S. Cl.
CPC ............ *B32B 27/20* (2013.01); *B32B 27/306* (2013.01); *B32B 27/32* (2013.01); *B32B 27/325* (2013.01); *B32B 27/34* (2013.01); *B32B 27/40* (2013.01); *F16L 55/1656* (2013.01); *G02B 1/00* (2013.01); *B32B 2250/40* (2013.01); *B32B 2255/205* (2013.01); *B32B 2274/00* (2013.01); *B32B 2307/4026* (2013.01); *B32B 2307/41* (2013.01); *B32B 2307/416* (2013.01); *B32B 2307/7242* (2013.01); *B32B 2597/00* (2013.01)

(58) Field of Classification Search
CPC ......... G02B 5/285–5/288; F16L 55/165; F16L 55/1656; B32B 1/08; B32B 15/00; B32B 27/08; B32B 27/12; B32B 27/20; B32B 27/306; B32B 27/32; B32B 27/325; B32B 27/34; B32B 27/40; B32B 2250/40; B32B 2255/205; B32B 2274/00; B32B 2307/4026; B32B 2307/41; B32B 2307/416; B32B 2307/7242; B32B 2597/00

See application file for complete search history.

(56) References Cited

U.S. PATENT DOCUMENTS

| 2010/0272936 | A1* | 10/2010 | White | B32B 27/08 428/35.4 |
| 2011/0083765 | A1* | 4/2011 | Stark | F16L 55/162 138/97 |
| 2013/0126029 | A1 | 5/2013 | Hummel | |
| 2015/0177432 | A1* | 6/2015 | Hebrink | G02C 7/10 359/359 |

FOREIGN PATENT DOCUMENTS

| EP | 1 876 015 A1 | 1/2008 |
| WO | WO 2009/070494 A1 | 6/2009 |
| WO | WO 2011/157356 A1 | 12/2011 |
| WO | WO 2013/026568 | 2/2013 |

OTHER PUBLICATIONS

EP Search Report, May 12, 2015.
German Search Report, Aug. 29, 2014.

\* cited by examiner

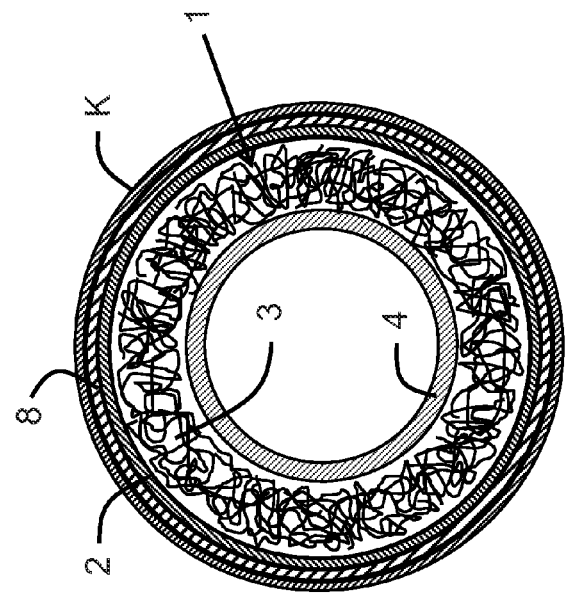
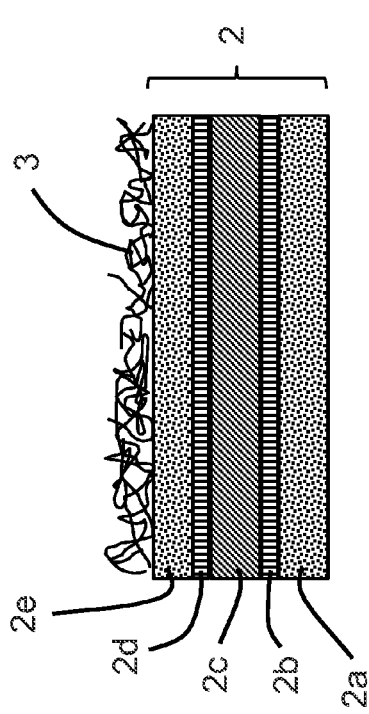
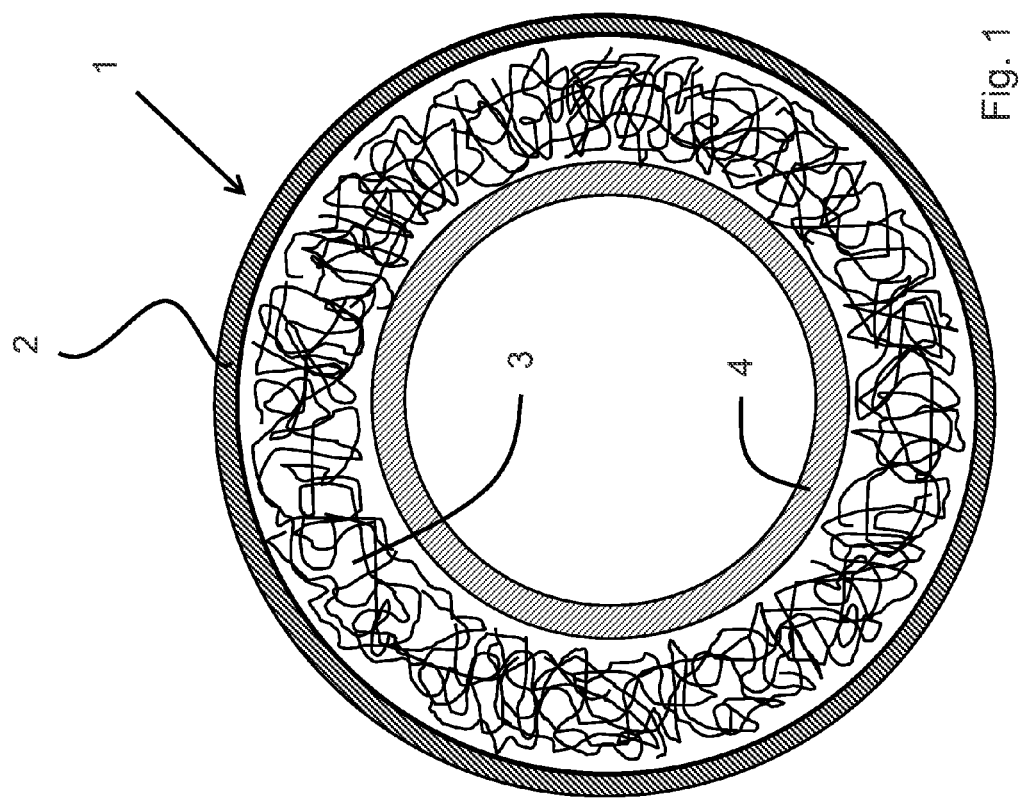

UV-IMPERMEABLE AND LIGHT-IMPERMEABLE FILM WITH A HIGH DEGREE OF REFLECTION

FIELD OF THE INVENTION

The invention relates to a multi-layered film, in particular, a multi-layered hose-shaped outer film for an insert hose of a pipe rehabilitation system.

BACKGROUND

For some years, such hose-shaped outer films, also called hose outer films or outer hose films, have been in practical use as parts of insert hoses during pipe rehabilitation, such as (for example) trenchless sewer pipe rehabilitation. Given its method, which is environmentally friendly and carried out with minimal expense, this type of sewer repair offers great advantages. A flexible insert hose (also called a hose liner or simply a liner) is drawn into the pipe to be rehabilitated (drawing-in method), whereas the insert hose slides over a sliding film or a so-called "pre-liner" previously laid in the sewer pipe.

With glass fiber hose liner systems with UV-curing or steam-curing, such an insert hose (hose liner) typically features one inner hose and one outer hose (inner or outer hose), between which a carrier material made of (for example) glass fibers is inserted, which carrier material is impregnated with reactive plastic resin. Thereby, the hose shape of the outer hose is obtained through the corresponding shaping and fusing of flat films. Commercial UP resins (polyester or unsaturated polyester resins), VE resins (vinyl ester resins) or EP resins (epoxy resins), for example, are used as reactive plastic resin. With UP or VE resins, the curing of the resins takes place, for example, with the assistance of photoinitiators (as radical generating agents). The curing may also take place thermally. The insert hose is inflated in the pipe until it fits against the inner pipe wall or the sliding film and/or the pre-liner, in order to subsequently cure the resin—by means of, for example, UV light from a light source slowly drawn through the pipe. Finally, the inner hose film of the insert hose is typically drawn out and removed. The layer with the carrier material and the cured resin is then exposed to the substances to be led through the pipe.

So that, during storage (that is, prior to installation in the pipe), the curing in the insert hose does not take place prematurely through the UV radiation of sunlight, it is known from WO 2013/026568 A1 to introduce a substance absorbing and/or reflecting UV radiation and, if applicable, short-wave light into an outer layer or a layer near the outer side, whereas non-silvery metal oxides, transition metal oxides and other inorganic and organic compounds may be used for this purpose. In one layer that is arranged on the other outer side of the outer film turned to the resin, an inorganic compound reflecting UV radiation, preferably a white pigment, is inserted. This measure serves to reflect UV rays that emanate from a UV source to be drawn through the pipe and has already permeated the resin, in order to increase the efficiency and speed of the curing process. However, it turns out that both the sealing and blocking effect against UV light and visible light (there, specified only for a restricted wavelength range) and that the reflection yield of this known hose-shaped outer film is still worthy of improvement.

An alternative is described in DE 297 00 236 U1, with which an external shell is metallically coated, or consists of a metal film wrapped in a helical manner around the carrier system. However, for achieving a seamless reflection, this arrangement is difficult to manage and expensive. In addition, the shell described therein always features a permeability for UV light that is still too high, by which the resin lying thereunder cannot be protected from premature curing.

SUMMARY OF THE INVENTION

A general task of the present invention is to provide a film with improved optical properties with respect to the blocking of UV light and visible light.

In reference to a hose-shaped outer film or a flat film, shapeable at a hose, for an insert hose of a pipe rehabilitation system, the task is to, with simple handling, combine optimum protection against UV radiation from the outside with a good reflection of UV radiation that emanates from a UV source drawn through the pipe.

Additional objects and advantages of the invention will be set forth in part in the following description, or may be obvious from the description, or may be learned through practice of the invention.

The advantages of the invention are to be seen in the fact that, in particular, through the combined deployment of silver-colored pigments in at least two layers or of two metallized outer layers or of at least one layer with silver-colored pigments and one metallized outer layer, on the one hand, and at least one UV absorber in at least one layer, on the other hand (these may be identical to one of the specified layers or—which is preferential in many embodiments—may be in one layer of the film varying from such layers), excellent optical properties with regard to the prevention of the transmission of external UV light and visible light (i.e., not from the UV source drawn through the pipe), such as sunlight, are achieved. The measurements of the films in accordance with the invention showed that the transmission values could be reduced by a factor of up to approximately 60 when compared to the previously known films, used as outer films of hose liners. Moreover, the film in accordance with the invention is designed to be highly reflective from both sides; i.e. the UV and visible radiation is reflected in a wavelength range from 200 to 800 nm, in particular from 300 nm, at a rate of more than 20%, from both sides of the film.

In the wavelength range from 200 to 800 nm, through the combination of the use of silver-colored pigments, on the one hand, and UV absorbers, on the other hand, a transmission of less than 0.1% is achievable. Since the transmission is also determined by the layer thickness and the film thickness (Lambert-Beer Law, see below), a corresponding harmonization—easily familiar to the specialist—with the at least one added UV absorber is necessary, in order to achieve the aforementioned transmission limit of 0.1%. As is known, the negative common logarithm of the transmission indicates absorbance (also called optical density), which represents a wavelength-dependent measure of opacity, i.e. the attenuation of radiation (such as light) after traversing a medium. Thereby, absorbance is defined as $E_\lambda=-\log_{10} (I/I_0) =-\log_{10} T$ with $E_\lambda$=absorbance, I=exiting radiation, $I_0$=entering radiation, T=transmission. The processes of absorption, scattering, diffraction and reflection (among other things) take part in absorbance, whereas the reflection losses in the above formula are already taken into account in the entering radiation $I_0$. Scattering and diffraction are usually negligible, as they are with the films in accordance with the invention. The above formula can also be written in the form of the Lambert-Beer Law: $E_\lambda=-\log_{10} (I/I_0)$ $=\epsilon_\lambda*c*d$, where $\epsilon_\lambda$ indicates the decadic absorbance coefficients for the wavelength $\lambda$, c is the absorber concentration in the relevant layer and d is the layer thickness. Thus, the Lambert-Beer Law describes the intensity of the attenuation of the radiation penetrating the film, as a function of the UV absorber concentration and the film thickness. In accordance with the invention, the film thickness and in particular the thickness of the layer or the layers with the added UV absorbers and their concentrations along with the silver-colored pigments in one or more layers are harmonized with each other in such a manner that a transmission of the film in a wavelength range from 200 to 800 nm is less than 0.1%, and reflects the UV radiation and short-wave visible radiation in a wavelength range from 200 to 800 nm at a rate of more than 20%.

In particular, in the case of a design of the film in accordance with the invention as an outer hose film, in the wavelength range from 200 to 500 nm, in which the photoinitiators commonly used for resin curing are activated (thus generating radicals), very low transmission values and high reflection values are of great advantage, since, otherwise, a premature resin curing takes place during storage, upon insertion into a sewer, etc. Resins that are able to be cured in the range from 300 nm and, in particular, in the range from approximately 350 nm to 400 nm, are frequently used.

Within the meaning of the present invention, the term "silver-colored" is understood to mean the optical sensory impression of a silvery color perceived by a viewer.

Within the meaning of the present invention, the term "pigments" is understood to mean color-giving substances that are insoluble, in contrast to dyes, within the scope of application.

Within the meaning of the present invention, the terms "opaque," "non-transparent," and "obscure" are understood to mean the optical sensory impression of complete opacity for visible light perceived by a viewer. In other words, a viewer cannot see through the layer; i.e., no visible light arrives through the layer or the outer film. In the present case, the wavelength range of visible light is understood as ranging from 380 nm to 780 nm. Thereby, a transmission in accordance with the invention of less than 0.1% in a wavelength range from 200 to 800 nm corresponds to perfect opacity. For this purpose, a corresponding test may be carried out in such a manner that the particular film is laid on a white DIN A4 page printed with black text (Arial font, font size of 10), and the readability of the text lying thereunder is assessed with a school grading system. Thereby, grade 6 corresponds to the finding that it is no longer detectable that text is under the film. This situation may also be drawn upon as a criterion for the specified opacity or lack of transparency of the film in accordance with the invention.

In the present case, the term "hose-shaped" comprises films that are already produced (for example, extruded) as a hose, and flat films formed as a hose, which is accomplished, for example, through sealing, welding or gluing.

Preferably, firstly, the type and quantity (in % by weight) of silver-colored pigments in the at least two layers or the aforementioned double-sided metallization or the aforementioned mixed form of, on the one hand, the layer with silver-colored pigments and, on the other hand, the metallization of an outer layer and, secondly, the type and quantity (in % by weight) of the at least one UV absorber—in harmonization with the overall thickness of the film and the thickness of the layer(s) with silver-colored pigments and, in particular, the thickness of the layer(s) with added UV absorbers—are selected in such a manner that the entire outer film allows radiation in the wavelength range from 200 nm to 800 nm (thus, slightly beyond the visible range as defined above) to pass through at a rate of less than 0.075%, preferably at a rate of less than 0.05%, and in particular preferentially at a rate of less than 0.025%.

Visible radiation in the wavelength range from 200 nm to 800 nm is reflected through the addition of silver-colored pigments and/or through metallization preferably at a rate of more than 20%, preferably at a rate of more than 30%, most preferentially at a rate of more than 40%.

In the case of a metallization, the optical density of the film in accordance with the invention is preferably greater than 1, in particular preferentially greater than 2.

In particular, in the case of a design of the film in accordance with the invention as an outer hose film for a hose liner, one of the two layers with the silver-colored pigments is, in accordance with a preferential embodiment, that outer layer that is directed at the hose interior, i.e., at the resin and at the inner hose film. The aforementioned outer layer principally serves the purpose of reflecting the UV radiation or light radiation emitting from a UV source or a light source, which is drawn through the insert hose inflated in the sewer pipe. Thereby, the UV radiation or light radiation, which undesirably arrives through the resin to be cured, without triggering the photoinitiating of the photoinitiator, is reflected at the silver-colored pigments and redirected to the resin. This increases the speed and uniformity of the resin curing; in addition, the energy of the UV rays and the light rays is used efficiently.

In addition, the at least one additional layer containing silver-colored pigments is preferentially the outer layer turned away from the resin, which is thus directed at the pipe to be rehabilitated. This outer layer prevents, likewise through its very high reflectivity, UV light and visible light (daylight) from arriving at the resin, and this from prematurely curing, in particular during its storage.

Accordingly, in the case of a design as an outer hose film, in accordance with a preferential embodiment, silver-colored pigments are inserted in the two outer layers. The relevant layer located closer to the resin is provided for the purpose of reflecting light from the UV source drawn through the inflated insert hose to the resin (see above), while the additional relevant layer lying on the outside serves the purpose of, in particular, reflecting daylight. In doing so, each of the two layers also supports the mode of action of the other layer. The few portions of light that, for example, penetrate the corresponding outer layer, despite the silver-colored pigments, are then reflected once again at least on the silvery pigments of the additional layer lying farther on the inside.

However, the layers with the silver-colored pigments are not necessarily formed as outer layers of the film in accordance with the invention. For example, one of these layers (or both) may be an inner layer. However, in this case, it is preferential that the outer layers are transparent, such that the high reflectivity of the (inner) layers with the silver-colored pigments is maintained.

With one alternative, both outer layers of the outer film are metallized, whereas the same effects as that of the pigment mixing in the two outer layers are achievable. With an additional alternative, one outer layer is metallized, while the aforementioned silver-colored pigments are inserted in at least one layer, whereas this layer is, for example, the other outer layer or one inner layer.

The silver-colored pigments are preferably selected from a group that comprises the following:

metallic pigments, preferably of the leafing type, except those made of zinc or tin;

metallic effect pigments, based on, for example, aluminum, silver, nickel, chromium, mercury, amalgam or alloys of the aforementioned metals, excluding those based on zinc or tin;

pearlescent pigments; and metallized substrates, such as metallized pearlescent pigments (mica pigments), for example through aluminum vapor-plating.

The metallic pigments and effect pigments may be the following, in particular: aluminum, titanium, chromium, nickel, amalgam (mercury alloy) or silver or a silver alloy.

Thereby, combinations of the above substances are possible without further work. Thus, a very high degree of reflection may be realized in particular through a mixture of aluminum pigments and pearlescent pigments.

Zinc and tin are excluded from the above lists. These are base metals that corrode in air or water. This effect, which could occur, in particular, upon a corresponding use of such metals in the outer layers, is undesirable, because the reflective properties would be impaired. In addition, such metals could dissolve out of the film (for instance, through salt formation) and then arrive in the groundwater. In contrast, aluminum is also a base metal, but it forms a protective oxide layer, and is therefore corrosion-resistant and weather-resistant.

It has proven to be advantageous if the pigment sizes of the silver-colored pigments are in the range from 0.1 μm to 100 μm, preferably in the range from 1 μm to 75 μm, in particular preferentially in the range from 5 μm to 50 μm. The concentration of the pigments in the silver-colored layers is advantageously from 0.01% by weight to 50% by weight, preferably from 0.1 to 50% by weight, in particular preferentially from 1 to 30% by weight.

If at least one of the outer layers of the film is metallized, the material of this metallization is preferably aluminum, titanium, chromium, nickel, amalgam (mercury alloy) or silver or a silver alloy.

In particular, if the film is formed as an outer hose film, in accordance with a preferred embodiment, differently colored dyes or pigments—in addition to the silver-colored dyes or pigments—are inserted in the outer layer directed at the hose exterior. In doing so, the high reflection effect is maintained. This can result in a company-specific identifier of the hose liner or the rehabilitated pipe. With a corresponding embodiment, silver-colored pigments may be present in one or more additional inner layers, which pigments ensure the reflection of light. The color impression from the outside may also exist in an overlapping of the differently colored pigments with the silver-colored pigments. However, this differently colored layer should be transparent, such that the reflective effect of the additional inner layers with silver-colored pigments is maintained.

Preferably, the layers (advantageously at least one), in which silver-colored pigments are inserted or on which a metallization is applied, contain—advantageously by more than 50% by weight—at least one thermoplastic olefin homopolymer or copolymer, whereas this may be modified. Such compounds have proven their worth in particular as outer layers for outer hose films. They offer good mechanical properties, and are easy to handle for the production of the films.

Alternatively, one or both of the outer layers of the outer hose film contain—advantageously by more than 50% by weight—at least one polyamide, which may be modified. The polyamide layer is transparent.

Generally, one or both outer layers of the film may be clear or transparent. Moreover, adhesion-promoting layers with at least one added UV absorber may be transparent. If the layer structure of a film in accordance with the invention is the following, for example: layer (a): polyamide or mixture predominantly with polyamide (abbreviated: polyamide (mixture)); layer (b): polyamide (mixture)); layer (c): adhesion promoter with UV absorber; layer (d): thermoplastic olefin homopolymer or copolymer or mixture predominantly with such compound (abbreviated: PE (mixture)) with silver-colored pigments; layer (e): PE (mixture) with silver-colored pigments, then the layers (a)-(c) may be transparent, such that the light coming from both sides of the film is reflected on the layers (d) and (e).

As an alternative to the polyamide proportion specified above, one or both of the outer layers of the outer hose film contains—advantageously by more than 50% by weight—at least one thermoplastic elastomer (TPE), in particular TPU (thermoplastic polyurethane), which may be modified.

Preferably, the type and quantity (in % by weight) of the added at least one UV absorber in the at least one layer is selected in such a manner that radiation in this layer (and thus in the entire film) is absorbed in a wavelength range from 200 nm to 450 nm, preferably in the wavelength range of UV radiation from 250 to 400 nm, at rate of more than 95%, preferably at a rate of more than 98%, in particular preferentially at a rate of more than 99.5%. Alternatively, the at least one UV absorber may be contained in several layers in such type and quantity that, in the entire film, radiation is absorbed from 200 nm to 450 nm at a rate of more than 95%, preferably at a rate of more than 98%, in particular preferentially at a rate of more than 99.5%.

In the present case, the term "UV light" is understood as ranging from 200 nm to 400 nm. Since there is no generally accepted lower or upper limit of UV radiation, it is assumed in the present case that there is an overlap range of UV radiation and visible radiation, which ranges from approximately 380 nm to approximately 400 nm.

UV absorbers frequently absorb radiation beyond the UV range, for example up to 450 nm. The reason for this is that UV absorbers also have an inherent color, which is usually yellowish. The absorption then takes place in the range from ultraviolet to blue.

The aforementioned at least one UV absorber may be of an inorganic or organic nature. In the case of an inorganic UV absorber, this may be (for example) a metal oxide, whereas the term "metal oxides" also includes transition metal oxides. Suitable metal oxides include, for example, titanium dioxide, iron oxide and zinc oxide. An advantageous example of a zinc oxide is Zincox®, which was developed by IBU-tec advanced materials AG, Weimar; Zincox® is a nano-scale ZnO with an average particle size of 10 nm, which is available on a technical scale as a powder or as a disagglomerated, stabilized and very easily processable suspension. Suitable metal oxide hydrate, which also includes transitional metal oxide hydrate, may also be used as UV absorbers. Benzotriazole, triazine, benzophenone and cyanoacrylate, for example, may be used as organic compounds. Moreover, derivatives of the aforementioned compounds, along with mixtures made of the aforementioned compounds, may be used. Inorganic UV absorbers are preferred.

It has proven to be advantageous if the at least one UV absorber is contained in the aforementioned layer in a concentration from 0.01 to 20% by weight, preferentially from 0.1 to 10% by weight and most preferentially from 0.5 to 5% by weight.

Advantageously, the at least one UV absorber is inserted in one adhesion-promoting layer (HV). This avoids, for instance, a migration of the UV absorber from the film, and thus ensures a durable mode of action. For example, in the case of a structuring of the outer film as a 5-layer film in the shape of PE (polyethylene)/HV/PA (polyamide)/HV/PE, the at least one UV absorber may be inserted in one or—which is preferred—both adhesion-promoting layers. In one or both PE outer layers, with such embodiments in which at least one adhesion-promoting layer of the at least one UV absorber is used, silver-colored pigments (for example) may be inserted. A relevant exemplary layer sequence for a 7-layer film is PE/PE/HV/PA/HV/PE/PE. Thereby, the formulation "PE layer" or "PA layer" signifies that the relevant layer mostly contains polyethylene or polyamide.

If the film is formed as an outer hose film, in accordance with one advantageous embodiment, the at least one UV absorber is inserted in a layer that is adjacent to one of the outer layers of the outer film. As a result, at least one part of the UV radiation is "trapped" in the layer closest to the resin. If, in the adjacent outer layer, it is also the case that the aforementioned silver-colored pigments are present and/or the aforementioned metallization is applied, in any case, only a small proportion of the radiation arrives in the layer with the at least one UV absorber.

An additional advantageous embodiment of the film, as an outer hose film, provides that at least one UV absorber is inserted in at least two layers of the hose-shaped outer film. In this connection, it is preferred that such two layers are each inner layers of the film, and are thereby, preferably, on the inside adjacent to the outer layers of the outer film. In the respective outer layers, for example, the silver-colored pigments are inserted (or a metallization is applied), and in the two layers adjacent to the inside of the UV absorber(s).

Embodiments for which both silver-colored pigments and at least one UV absorber are inserted in one layer (or more) are also possible.

The layers in which the silver-colored pigments and/or UV absorbers are inserted contain, in particular preferentially, at least one thermoplastic olefin homopolymer or copolymer, which may be modified. If, for example, the at least one UV absorber exists in an adhesion-promoting layer (see above) made of an olefin homopolymer or copolymer, this is preferably modified with at least one organic acid or one cyclic organic acid anhydride, preferably with maleic anhydride.

At least one, preferably two outer layers of the multi-layered film in accordance with the invention preferentially contain at least one thermoplastic olefin homopolymer or copolymer, which may be modified. Adhesion-promoting layers that possibly exist may also be structured in such a manner.

Preferred olefin homopolymers or copolymers are those of α, β-unsaturated olefins with 2-10 carbon atoms. Compounds that are suitable for this are, preferably, ethylene homopolymers (polyethylene, PE), preferably LDPE (polyethylene of high density in the range from 0.86-0.93 $g/cm^3$), LLDPE (linear low density polyethylene), HDPE (polyethylene of high density in the range from 0.94 and 0.97 $g/cm^3$) and mPE (PE polymerized on the basis of metallocene catalysts), propylene homopolymers (polypropylene, PP), butylene homopolymers (polybutylene, PB) and isobutylene homopolymers (polyisobutylene, PI) or mixtures made of at least two of the specified polymers. These olefin homopolymers or copolymers may be used in the layers that contain the silver-colored pigments and/or the UV absorbers.

In particular, it is very advantageous for pipe rehabilitation if at least one inner barrier layer against the passage of gases and/or chemical substances is provided, whereas the barrier layer preferably contains ethylene vinyl alcohol (EVOH) or polyamide (PA) or cyclic olefin copolymers (COC) or a combination of these, preferentially each with up to 100% by weight made of such compounds. Preferably, homopolyamides or copolyamides, preferably PA 6, PA 12, PA 66, PA 6I and PA 6T, may be used as polyamides. Such copolymers or mixtures of at least two polyamides are also possible without further work.

If, for example, a PA barrier layer is provided, this may be connected either at one side or at both sides each with one adhesion-promoting layer, each with one layer, preferably an outer layer. If these two outer layers predominantly (up to 100% by weight) contain one thermoplastic olefin homopolymer or copolymer, which may be modified, the already specified 5-layer structure of PE/HV/PA/HV/PE is obtained, whereas the silver-colored pigments or the aforementioned at least one UV absorber are contained in the PE and HV layers.

In a particular preferential embodiment, the film features at least two, preferably exactly two, layers with aforementioned silver-colored pigments and at least two, preferably exactly two, layers with at least one UV absorber each. Thereby, in accordance with advantageous embodiments, the layer structure of the film regarding the specified layers is symmetrical, whereas the layers are arranged with at least one UV absorber between the layers with the silver-colored pigments. The symmetrical structure has the advantage that, on the one hand, attention need not be paid to the winding of this film and, on the other hand, when sealing a flat film in accordance with the invention to the outer film hose, attention no longer needs to be paid to the fact that only the reflective side is always arranged inward to the axis of the sewer. In doing so, handling is simplified and susceptibility to errors is minimized.

The statements above apply analogously to a design of films with two metallized outer layers and at least two, preferably exactly two, layers with the aforementioned at least one UV absorber, whereas, likewise here, the film structure is advantageously symmetrical.

In accordance with advantageous embodiments, a film features a layer structure from the following group, whereas, for the case of a design of the film as an outer film for an insert hose of a pipe rehabilitation system, the layer (a) is provided in a manner showing the pipe wall and the layer (e) is provided in a manner showing the pipe axis:

1) Layer (a): PA or PA mixture; (transparent)
   Layer (b): Adhesion promoter with UV absorber; (transparent)
   Layer (c): PE or PE mixture with silver-colored pigments;
   Layer (d): PE or PE mixture with silver-colored pigments;
   Layer (e): PE or PE mixture with silver-colored pigments;
   if necessary with additional, transparent (if applicable), inner and/or outer layers;

2) Layer (a): PA or PA mixture; (transparent)
   Layer (b): PA or PA mixture; (transparent)
   Layer (c): Adhesion promoter with UV absorber; (transparent)
   Layer (d): PE or PE mixture with silver-colored pigments;
   Layer (e): PE or PE mixture with silver-colored pigments;
   if necessary with additional, transparent (if applicable), inner and/or outer layers;

3) Layer (a): PE or PE mixture with silver-colored pigments;
   Layer (b): Adhesion promoter with UV absorber;
   Layer (c): PA or PA mixture;

Layer (d): Adhesion promoter with UV absorber;
Layer (e): PE or PE mixture with silver-colored pigments; if necessary with additional, transparent (if applicable), inner and/or outer layers;

4) Layer (a): PA or PA mixture; (transparent)
Layer (b): Adhesion promoter with UV absorber; (transparent)
Layer (c): PE or PE mixture with silver-colored pigments;
Layer (d): Adhesion promoter with UV absorber;
Layer (e): PE or PE mixture with silver-colored pigments; if necessary with additional, transparent (if applicable), inner and/or outer layers;

For the specified films and also for other layer structures of a film in accordance with the invention, as an optional addition, at least one UV absorber may be added in at least one of the inner layers of the respective film. For the above film 1), for example, in the layers (c) and/or (d), for the above film 2), for example, in the layers (d), and for the above film (4), for example, in the layers (c).

In the present case, the term "PE or PE mixture" is understood as at least one thermoplastic olefin homopolymer or copolymer (for purposes of abbreviation, polyethylene (PE) is used here) or a mixture with predominantly such a compound (to which, in accordance with the lists set forth above, silver-colored pigments may be added). The term "PA or PA mixture" is understood to mean that such layers consist of at least one polyamide or a mixture predominantly containing polyamide.

Preferentially, the overall thickness of the film in accordance with the invention is between 10 µm and 1000 µm, preferably between 20 µm and 500 µm and in particular preferentially between 30 µm and 400 µm.

The film may also be laminated on one side or both sides with another film or with a material absorbent for resin and liquids, and in particular with a material absorbent for resin and liquids, in order to obtain a corresponding composite. For example, the film, if this is formed as a hose outer film, may be laminated with a sliding film, in order to realize an insertion of this composite into a pipe to be rehabilitated that reduces sliding friction and is free of damages.

As an alternative or in addition, the film may be laminated with a layer made of material absorbent for resin and/or liquids. This results in a composite that combines the UV light protection film with a (for example) non-woven layer impregnated with resin or to be impregnated with resin, thus substantially simplifying handling. In particular, the connection of the UV-impermeable and light-impermeable thus may be achieved at the carrier including the resin, which leads to an increased stability of the liner. Finally—through the connection with a material absorbent for resin and liquids—a close clinging of the outer film with the carrier material impregnated with resin is obtained. Thus, the outer film does not offer any contact surface, in order to not be damaged upon the drawing in of the hose liner, by the outer film sticking out too far from the carrier material with resin. In addition, air pockets (bubbles) are avoided. As materials absorbent for resin or liquids (or thus permeable or impregnable materials), materials consisting of fibers may in particular be used; these are preferably non-wovens, felts, fabrics, knitted fabric, knotted fabrics, sheets, general textiles, and also foams. Thereby, "absorbent" means that liquid or resin may be—at least partially—picked up by the material. In the ideal case, the material is saturated with resin and liquid.

Within the framework of this invention, the term "non-woven" is understood as a fabric made of fibers of limited length, endless fibers or cut yarn of any kind and any origin, which have been joined together in any manner into a non-woven layer or a fiber layer or a fibrous web and are connected to each other in any manner. This does not include the interlacing or intertwining of yarns, as this occurs upon weaving, working, knitting, lace-making, braiding and the production of tufted products. The vast majority of non-woven fabrics are flexible textile fabrics, since they are built up from textile fibers as the main structural element.

Denim, for example, may be used as fabric. Other fabrics, sheets, knotted fabrics, etc. may also be used, as long as they are able to absorb resin or liquids, or they may thus be impregnated.

A part of the invention is also an insert hose for the hose lining process for pipe rehabilitation, in particular for trenchless sewer rehabilitation, whereas the insert hose comprises the previously described hose-shaped outer film, along with a hose-shaped, UV radiation-permeable inner film, and a carrier material arranged between these two films, which is impregnated with a reactive plastic resin. The invention also relates to the corresponding use of such an insert hose for the rehabilitation of a pipe, preferably an underground sewer pipe.

The specified UV-permeable inner film is preferentially constructed according to the state of the art, as described, for example, in WO 2013/026568 A1.

In alternative uses, the film may be used as protective packaging material for food or for the so-called "non-food sector," as outer cladding, as outer coverage of building parts, as bag-in-box film, as membrane film, as film for safety glasses, solar modules, or airbags, as adhesive film, tape or ribbon, for cable sheathing, in protective suits, for textiles and clothing, as decorative film in laminates for wood, natural fiber and plastic composite materials, as protective film in the prepreg area (pre-impregnated fibers), as protective film, for signs and display panels, for medical applications such as adhesive strips, for hygiene products such as diapers, for displays or as insulating material.

The advantageous embodiments specified above—to the extent that they are not technically mutually exclusive—may be combined without further work.

BRIEF DESCRIPTION OF THE DRAWINGS

The invention is more specifically described below, on the basis of one embodiment. The following is shown:
FIG. 1 is a hose liner in cross-section;
FIG. 2 is a cross-section through the outer film of the hose liner with an adjacent resin layer in accordance with FIG. 1;
FIG. 3 is a sewer pipe to be rehabilitated with a pre-liner and the hose liner in accordance with FIG. 1, in cross-section.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a hose liner or an insert hose 1 in an inflated state, for lining a sewer pipe K to be rehabilitated (see FIG. 3). The hose liner 1 features an outer hose film or hose-shaped outer film 2, a resin carrier system 3 and an inner hose film 4. This structure of a hose liner has been known for a long time, for example from DE 10 2010 023 764 A1. The layer structure and the components of the layers are more precisely described above.

In the present case, the aforementioned outer hose film 2 features the following layer structure (see FIG. 2):

Layer 2a: thermoplastic olefin homopolymer or copolymer (here also abbreviated as "PE") with silver-colored pigments;
Layer 2b: Adhesion promoter (HV) with UV absorber;
Layer 2c: Polyamide (PA);
Layer 2d: Adhesion promoter (HV) with UV absorber;
Layer 2e (this is preferably adjacent to the resin carrier system 3): thermoplastic olefin homopolymer or copolymer (PE) with silver-colored pigments.

Exemplary alternative layer structures (for example, a polyamide layer/HV with UV absorber/PE with silver-colored pigments/PE with silver-colored pigments/PE with silver-colored pigments (the latter layer preferably adjacent to the resin carrier system 3) are set forth above and below (see examples).

FIG. 3 shows, in cross-section, the insert hose 1 drawn in a sewer pipe K to be rehabilitated, whereas a so-called "pre-liner" 8 is provided between the pipe wall of the sewer pipe K and the insert hose 1, which pre-liner is known from the state of the art. It serves the purpose of mechanically protecting the insert hose 1 and reducing friction upon the drawing of the hose liner 1 into the sewer pipe K.

FIGS. 1-3 may also be drawn on as an embodiment with two metallized outer layers. Thereby, a metallization is applied on each of the layers 2a and 2e (and preferably no silver-colored pigment is inserted). With this embodiment, the other layers 2b, 2c, 2e may be unchanged, compared to the previously described embodiment. FIGS. 1-3 are also representative for the case of a metallized outer layer and at least one (preferably different) layer with silver-colored pigments. Thereby, a metallization is applied on one outer layer (either 2a or 2e), and silver-colored pigments are inserted in one (preferably different) layer (for example, in the layer 2e or 2a).

EXAMINED EMBODIMENTS

The following examples and comparative examples serve the purpose of describing the invention, and are not to be interpreted as limiting. The following presents various comparative examples (films V1-V6) and sample films in accordance with the invention (films B1-B4), which were examined with regard to their reflective and transmission properties.

I. Materials Used

The LDPE used in many of the following examples is Lupolen 2420 F made by LyondellBasell Polymers. The Lupolen 3010D that is used is also an LDPE made by LyondellBasell Polymers.

Durethan C38 F made by Lanxess is a copolyamide with medium viscosity.

Admer NF498E made by Mitsui Chemicals is an LDPE modified with maleic anhydride groups, possesses a high degree of adhesion to PET, EVOH and PA, is very easily processable and features a thermal stability that is equivalent to ordinary PE.

Luvofilm 9679 is a processing aid made by Lehmann & Voss & Co. KG, which was present in an LDPE master batch with fluoroelastomer.

The used silver-colored pigments made by GRAFE Color Batch GmbH were the following:

Grafe 13-08486: approx. 5 µm, "fine"; 30% pigment by weight

Grafe 13-08485: approx. 10 µm, "coarse"; 30% pigment by weight

Grafe 13-08487: approx. 20 µm, "very coarse"; 35% pigment by weight

Constab UVA 01490 LD made by CONSTAB Polyolefin Additives GmbH is a UV-absorber concentrate for equipping products based on PE and its copolymers, which is to fulfill the UV barrier tasks for the protection of the underlying material. The density is 1.830 g/cm$^3$ (according to ISO 1183) and 970 kg/m$^3$ (according to ISO 60). The concentration specifications that were used with this UV absorber are reproduced in the following tables, whereas, for example, the "4%" specification means that 4% by weight UV absorbers in addition to, for example, 96% by weight PE-LD are present.

II. Production of Multi-Layered Films

The films set forth in the following tables were produced by blown film extrusion.

III. Measurement of the Films

The measurement of the reflection of the film was carried out with the wavelengths of 350 nm, 400 nm and 450 nm with the Specord 200 plus device made by Analytik Jena. The measuring area ranged from 200 to 800 nm. A measuring angle of 8° was employed.

The measurement of the transmission also took place with the aforementioned Specord 200 plus device. The measuring area also ranged from 200 to 800 nm.

IV. Measured Films

The weight percentage specifications refer to the total weight of the particular layer.

Examples B1-B4 include multi-layered films in accordance with the invention, while the comparative films V1-V6 are not formed in accordance with the invention.

Example B1

Silver-Colored Film with UV Absorber; Color Batch: Grafe 13-08485

| Layer number | Composition | Proportion in layer by % | Thickness in µm |
|---|---|---|---|
| 1 | Luvofilm 9679 | 0.5 | 75 |
|   | Lupolen 2420 F | 79.5 |   |
|   | Silver color batch | 20 |   |
| 2 | Mitsui Admer NF 498 E adhesion promoter | 96 | 12 |
|   | Constab UVA 01490 LD UV absorber | 4 |   |
| 3 | Durethan C 38 F | 100 | 26 |
| 4 | Mitsui Admer NF 498 E adhesion promoter | 96 | 12 |
|   | Constab UVA 01490 LD UV absorber | 4 |   |
| 5 | Luvofilm 9679 | 0.5 | 75 |
|   | Lupolen 2420 F | 79.5 |   |
|   | Silver color batch | 20 |   |

200 µm

Example B2

Silver-Colored Film with UV Absorber; Silver Color Batch: Grafe 13-08486

| Layer number | Composition | Proportion in layer by % | Thickness in μm |
|---|---|---|---|
| 1 | Luvofilm 9679<br>Lupolen 2420 F<br>Silver color batch | 0.5<br>79.5<br>20 | 75 |
| 2 | Mitsui Admer NF 498 E adhesion promoter<br>Constab UVA 01490 LD UV absorber | 96<br><br>4 | 12 |
| 3 | Durethan C 38 F | 100 | 26 |
| 4 | Mitsui Admer NF 498 E adhesion promoter<br>Constab UVA 01490 LD UV absorber | 96<br><br>4 | 12 |
| 5 | Luvofilm 9679<br>Lupolen 2420 F<br>Silver color batch | 0.5<br>79.5<br>20 | 75 |
| | | | 200 μm |

Example B3

Silver-Colored Film with UV Absorber; Silver Color Batch: Grafe 13-08487

| Layer number | Composition | Proportion in layer by % | Thickness in μm |
|---|---|---|---|
| 1 | Luvofilm 9679<br>Lupolen 2420 F<br>Silver color batch | 0.5<br>84.5<br>15 | 75 |
| 2 | Mitsui Admer NF 498 E adhesion promoter<br>Constab UVA 01490 LD UV absorber | 96<br><br>4 | 12 |
| 3 | Durethan C 38 F | 100 | 26 |
| 4 | Mitsui Admer NF 498 E adhesion promoter<br>Constab UVA 01490 LD UV absorber | 96<br><br>4 | 12 |
| 5 | Luvofilm 9679<br>Lupolen 2420 F<br>Silver color batch | 0.5<br>84.5<br>15 | 75 |
| | | | 200 μm |

Example B4

Double-Sided Metallized Film with UV Absorber

| Layer number | Composition | Proportion in layer by % | Thickness in μm |
|---|---|---|---|
| 1 | Luvofilm 9679<br>Lupolen 2420 F | 0.5<br>99.5 | 75 |
| 2 | Mitsui Admer NF 498 E adhesion promoter<br>Constab UVA 01490 LD UV absorber | 96<br><br>4 | 12 |
| 3 | Durethan C 38 F | 100 | 26 |
| 4 | Mitsui Admer NF 498 E adhesion promoter<br>Constab UVA 01490 LD UV absorber | 96<br><br>4 | 12 |
| 5 | Luvofilm 9679<br>Lupolen 2420 F | 0.5<br>99.5 | 75 |
| | | | 200 μm |

COMPARATIVE EXAMPLES

Comparative examples V1 to V4: As with the examples B1 to B4, only without the Constab UVA 01490 LD UV absorber, thus, for example, for

Comparative Example V1

Silver Color Batch: Grafe 13-08485

| Layer number | Composition | Proportion in layer by % | Thickness in μm |
|---|---|---|---|
| 1 | Luvofilm 9679<br>Lupolen 2420 F<br>Silver color batch | 0.5<br>79.5<br>20 | 75 |
| 2 | Mitsui Admer NF 498 E adhesion promoter | 100 | 12 |
| 3 | Durethan C 38 F | 100 | 26 |
| 4 | Mitsui Admer NF 498 E adhesion promoter | 100 | 12 |
| 5 | Luvofilm 9679<br>Lupolen 2420 F<br>Silver color batch | 0.5<br>79.5<br>20 | 75 |
| | | | 200 μm |

Comparative Example V5

As with example 1, only without UV absorber and without silver color batch.

| Layer number | Composition | Proportion in layer by % | Thickness in μm |
|---|---|---|---|
| 1 | Luvofilm 9679<br>Lupolen 2420 F | 0.5<br>99.5 | 75 |
| 2 | Mitsui Admer NF 498 E adhesion promoter | 100 | 12 |
| 3 | Durethan C 38 F | 100 | 26 |
| 4 | Mitsui Admer NF 498 E adhesion promoter | 100 | 12 |
| 5 | Luvofilm 9679<br>Lupolen 2420 F | 0.5<br>99.5 | 75 |
| | | | 200 μm |

Comparative Example V6

Here, the 5-layer film from example 1 of WO 2013/026568 A1 was measured; the thickness of it amounted to 200 μm. 1.5% ethylene blue 69-2025 granulate by weight was contained in the outer layer directed at the outer environment, 6% Remafin black &E-AE (40% carbon black) by weight was contained in the subsequent layer and 20% Remafin white RCL by weight was contained in the outer layer directed inward.

V. Results

The following table provides an overview of the measured reflection for the wavelengths of 350 nm, 400 nm, 450 nm for the sample films B1-B4 and the comparative films V1-V6. With the double-sided metallized film of the example B4, the measurement values of both film sides are indicated.

| Designation | Reflection in % at 200 nm | Reflection in % at 350 nm | Reflection in % at 400 nm | Reflection in % at 450 nm | Reflection in % at 600 nm |
|---|---|---|---|---|---|
| B1 | 49.3 | 33.6 | 57.1 | 58.7 | 56.7 |
| B2 | 45.1 | 30.3 | 55.1 | 55.8 | 50.0 |
| B3 | 58.9 | 63.4 | 58.6 | 56.4 | 57.5 |
| B4 | 93.6/93.4 | 93.9/93.7 | 93.3/93.4 | 92.9/93.1 | 93.0/93.0 |
| V1 | | | As for B1 | | |
| V2 | | | As for B2 | | |
| V3 | | | As for B3 | | |
| V4 | | | As for B4 | | |
| V5 | 1.7 | 3.2 | 3.4 | 4.0 | 4.1 |
| V6 | 7.2 | 9.3 | 11.4 | 14.3 | 15.6 |

The following table provides an overview of the measured transmission for the wavelengths of 350 nm, 400 nm, 450 nm for the sample films B1-B4 and the comparative films V1-V6:

| Designation | Transmission in % at 200 nm | Transmission in % at 350 nm | Transmission in % at 400 nm | Transmission in % at 450 nm | Transmission in % at 600 nm |
|---|---|---|---|---|---|
| B1 | 0.014 | 0.015 | 0.016 | 0.014 | 0.013 |
| B2 | 0.009 | 0.008 | 0.007 | 0.009 | 0.008 |
| B3 | 0.020 | 0.020 | 0.021 | 0.025 | 0.024 |
| B4 | 0.007 | 0.007 | 0.007 | 0.007 | 0.007 |
| V1 | 0.57 | 0.55 | 0.65 | 0.66 | 0.66 |
| V2 | 0.33 | 0.31 | 0.42 | 0.39 | 0.40 |
| V3 | 1.11 | 1.00 | 1.00 | 1.10 | 1.12 |
| V4 | 0.09 | 0.09 | 0.08 | 0.08 | 0.09 |
| V5 | 83.91 | 86.42 | 92.94 | 93.22 | 94.12 |
| V6 | 0.82 | 0.72 | 0.69 | 0.63 | 0.65 |

With $E_\lambda = -\log_{10} T$, the absorbance (optical density) for the respective wavelengths can be calculated from the above transmission values. Thereby, absorbance values of 1.60 (transmission T=0.025) to 2.16 (transmission T=0.007) result from the examples B1 to B4).

VI. Assessment and Interpretation

With the films from the examples B1 to B3 and the comparative examples V1 to V3, a high degree of reflection of both visible light and UV radiation is achieved, on the one hand, through the addition of a color batch with silver-colored metal pigments in the films, preferentially in the two outer layers. The silver-colored color batches that were used contained aluminum metal pigments, the sizes of which differed depending on the color batch. With the examples B2 and the comparative example V2, the metal pigments featured an average size of around 5 μm and are designated as "fine." With the examples B1 and the comparative example V1, the metal pigments featured an average size of around 10 μm and are designated as "coarse." With the examples B3 and the comparative example V3, the metal pigments featured an average size of around 20 μm and are designated as "very coarse."

Within the framework of this invention, it turned out that, as the metal pigments in the used silvery color batch were more fine, decreasing reflectivity in the films in terms of visible light and in particular in terms of UV light (for example at a wavelength of 350 nm) was observed. Thus, the reflection for the example B2 and the comparative example V2 was in the UV range of 350 nm at 30.3%.

The use of a color batch with somewhat coarser metal pigments (B1 and V1) led to a reflection at 350 nm of 33.6%. When using a color batch with even coarser metal pigments (example B3 and comparative example V3), at 63.4%, the highest reflection was found within the framework of this measurement series.

Surprisingly, with an increasing wavelength—in particular, from the range of wavelength of visible light (400 nm)—the size of the metal pigments contained in the color batch only has a small effect on the reflectivity of the film. Thus, with B1 to B3 and V1 to V3 at a wavelength of 400 nm and 450 nm, with values for the reflection in the range of 55.1% to 58.7%, nearly identical values are found. These are values that suggest very good reflection. Moreover, the reflection values for 600 nm are at 56.7% (B1 and V1), 50.0% (B2 and V2) and 57.5% (B3 and V3) in this range.

With the film from the example B4 and the comparative example V4, an even greater reflection of both visible light and UV radiation was achieved, on the other hand, by the fact that the film was metallized on both sides, for example through vapor-plating with aluminum. The types of metallization are known to the specialist.

Accordingly, the highest reflectivity of the film is realized by far with a metallization, which, for the aluminum vapor-plating of the film used here, is nearly independent of the wavelength of the UV and visible light. Thus, with B4 and V4, for all measured wavelengths of 200 nm, 350 nm, 400 nm, 450 nm and 600 nm, reflection values of well over 90% are achieved. Based on the mirror effect, the UV and light radiation is nearly entirely reflected.

By contrast, the transparent film from the comparative example V5, which neither contains a metal pigment nor is metallized, has only a low reflectivity, as shown by the values in the range of 1.7 to 4.0% for the wavelengths of 200, 350, 400, 450 and 600 nm.

Surprisingly, with the film from comparative example V6, a significantly lower reflection was determined, as described in patent WO2013/026568. The use of a white layer, with a black layer lying underneath, led only to reflection values between 7.2% (200 nm) and 15.6% (600 nm).

This shows that a high reflectivity of a film is preferentially and ideally obtained through the use of silver-colored metal pigments or through metallization.

Nevertheless, it has been shown that the UV-protection and light-protection effect of films, which either contain silver-colored metal pigments or are metallized and therefore exhibit a high degree of reflection, for their use, for instance, as outer films for hose liners is often not yet optimal. This is shown by the comparative examples V1 to V5, with a view to the values for the transmission with the wavelengths of 350 nm, 400 nm and 450 nm. The lowest transmission values are found with 0.08 to 0.09% for the double-sided metallized film from the comparative example V4.

With the films that were dyed with the assistance of silver-colored color batches, the transmission values are even higher. Despite the high concentration for the silver color batch in both outer layers of the films, the films from the comparative examples V1, V2 and V3 show transmission values in the range from 0.31% (V2 at 350 nm) to 1.10% (V3 at 450 nm).

Additionally, the coarser the metal pigments in the film, the higher its transmission. Thereby, with a prolonged exposure to light—particularly UV light in the range from 350 to 380 nm—there is always the risk that, with a hose liner, the reactive resin located under the UV and light protection outer film may be photochemically prematurely cured through activation of the photoinitiator, rendering the hose liner unusable.

Thus, outer films previously used in the state of the art, which either contain metal pigments or are metallized, are distinguished by very high values for light reflection. However, they have transmission values that are still too high; i.e., the proportion of UV radiation and light radiation penetrating the film is still too high for many applications.

As can be seen in the examples B1 to B4, the transmission is significantly reduced if a UV absorber is added to the film in at least one layer, but preferentially in two or more layers. Thus, the transmission of UV radiation (350 nm) is reduced by a factor of 50, as shown in the comparison of example B3 with comparative example V3. Here, through the addition of UV absorbers, transmission was able to be reduced from 1.00% to 0.02%.

The same applies to the reduction of the transmission of visible light for wavelengths ranging from 400 nm to 450 nm. This gave rise to a reduction in transmission by a factor of over 40, if the films were staggered with UV absorbers. Even with the metallized films from the comparative example V4, which in any event already have low transmission values, their transmission in the UV and light range may be once again reduced by more than a factor of 10, which example B4 shows.

Comparative example V5 shows that a transparent film without a UV absorber lets UV and visible light through, almost unimpeded. The transmission rates are well over 80%.

The comparative film V6 described in the state of the art is likewise insufficient in terms of UV and light transmission. In the wavelength range from 350 nm to 450 nm, the transmission was between 0.63 and 0.72%. Here, the values for transmission were in the order of magnitude of a silvery film with metal pigments without a UV absorber (V1 to V3).

The invention is not limited to the described embodiments. Variations within the claims and combinations of characteristics of individual claims are easily possible.

The invention claimed is:

1. A multi-layered film formed as a hose-shaped outer film for an insert hose of a pipe rehabilitation system, comprising:
   a plurality of film layers, wherein the film layers have one or more of:
     (a) silver-colored pigments contained in at least two of the film layers;
     (b) a metallization applied on both outer film layers of the multi-layer film; or
     (c) silver-colored pigments contained in at least one film layer and a metallization applied on an outer film layer of the multi-layer film;
   a UV absorber contained in at least one of the film layers; and
   wherein a harmonization of the film layer thicknesses and an overall thickness of the multi-layer provides that the multi-layer film is permeable to UV light and visible light in a wavelength range from 200 to 800 nm at a rate of less than 0.1% and is perceived by a viewer as opaque, and that UV radiation and visible radiation is reflected in a wavelength range from 200 to 800 nm a rate of more than 20%; and
   wherein the multi-layered film is an outer film for an insert hose of a pipe rehabilitation system and surrounds a hose-shaped carrier system with curable resin, the outer film having an outer film layer towards a sewer to be renovated designated as Layer (a), and an opposite outer layer towards an interior of the insert hose designated as Layer (e), the multi-layered film having a layer structure from the following group:
   1) Layer (a): PA (polyamide) or PA mixture;
      Layer (b): Adhesion promoter with UV absorber;
      Layer (c): PE (polyethylene) or PE mixture with silver-colored pigments;
      Layer (d): PE or PE mixture with silver-colored pigments;
      Layer (e): PE or PE mixture with silver-colored pigments;
   2) Layer (a): PA or PA mixture;
      Layer (b): PA or PA mixture;
      Layer (c): Adhesion promoter with UV absorber;
      Layer (d): PE or PE mixture with silver-colored pigments;
      Layer (e): PE or PE mixture with silver-colored pigments;
   3) Layer (a): PE or PE mixture with silver-colored pigments;
      Layer (b): Adhesion promoter with UV absorber;
      Layer (c): PA or PA mixture;
      Layer (d): Adhesion promoter with UV absorber;
      Layer (e): PE or PE mixture with silver-colored pigments;
   4) Layer (a): PA or PA mixture;
      Layer (b): Adhesion promoter with UV absorber;
      Layer (c): PE or PE mixture with silver-colored pigments;
      Layer (d): Adhesion promoter with UV absorber;
      Layer (e): PE or PE mixture with silver-colored pigments.

2. The multi-layered film according to claim 1, wherein the outer film surrounds a hose-shaped carrier system with curable resin, and the carrier system surrounds a hose-shaped liner.

3. The multi-layered film according to claim 1, wherein the outer film is permeable to UV light and visible light in a wavelength range from 200 to 800 nm at a rate of less than 0.075%.

4. The multi-layered film according to claim 1, wherein the outer film reflects visible radiation in a wavelength range from 200 to 800 nm at a rate of more than 30%.

5. The multi-layered film according to claim 1, wherein silver-colored pigments and differently colored dyes or pigments are contained in an outer film layer of the outer hose film pointing to the sewer.

6. The multi-layered film according to claim 1, wherein one or both outer film layers of the multi-layered film contain the silver-colored pigments.

7. The multi-layered film according to claim 1, wherein the silver-colored pigments are selected from the group consisting of:
   metallic pigments, except those made of zinc or tin;
   metallic effect pigments based on aluminum, silver, nickel, chromium, mercury, amalgam or alloys of the aforementioned metals, excluding those based on zinc or tin;
   pearlescent pigments;
   metallized substrates, including metallized pearlescent pigments (mica pigments), including metallized substrates from aluminum vapor-plating; and
   mixtures of the above pigments.

8. The multi-layered film according to claim 7, wherein an average pigment size of the silver-colored pigments are in the range from 0.1 µm to 100 µm.

9. The multi-layered film according to claim 8, wherein the silver-colored pigments are in a concentration from 0.01 to 50% by weight in one or more of the film layers.

10. The multi-layered film according to claim 1, wherein at east one of the two film layers containing silver-colored pigments or an applied metallization contains at least one thermoplastic olefin homopolymer or copolymer.

11. The multi-layered film according to claim 1, wherein the UV absorber is selected from the group consisting of;
inorganic compounds, including metal oxides, which includes transition metal oxides such as titanium oxide, iron oxide and zinc oxide, along with metal oxide hydrates, which includes transition metal oxide hydrates;
organic compounds, including as benzotriazoles, triazines, benzophenones, and cyanoacrylates;
derivatives of the aforementioned compounds; and
mixtures of the aforementioned compounds.

12. The multi-layered film according to claim 1, wherein the UV absorber is contained in at least one of the film layers in a concentration of 0.01 to 20% by weight.

13. The multi-layered film according to claim 11, wherein the film layer containing the UV absorber a thickness of less than 100 µm.

14. The multi-layered film according to claim 11, wherein the film layer containing the UV absorber is one of an adhesion-promoting layer of the film, or an inner layer of the film.

15. The multi-layered film according to claim 1, wherein the film layer containing the UV absorber is an internal film layer adjacent to one of the outer film layers of the multi-layered film.

16. The multi-layered film according to claim 1, wherein UV absorber is contained in two of the film layers, wherein at least one of two film layers is internal and adjacent to one of the outer film layers of the multi-layered film.

17. The multi-layered film according to claim 1, wherein one or both outer film layers of the multi-layered film contains at least one thermoplastic olefin homopolymer or copolymer.

18. The multi-layered film according to claim 1, wherein one or both outer film layers of the multi-layered film contains at least one polyamide.

19. The multi-layered film according to claim 1, wherein one or both outer film layers of the multi-layered film contains at least one thermoplastic elastomer (TPE), including thermoplastic polyurethane (TPU).

20. The multi-layered film according to claim 1, further comprising an inner barrier layer against passage of gases or chemical substances, wherein the barrier layer contains one or more of ethylene vinyl alcohol (EVOH), polyamide (PA), cyclic olefin copolymers (COC), up to 100% by weight of the barrier layer.

21. The multi-layered film according to claim 1, wherein the multi-layered film has an overall thickness between 10 µm and 1000 µm.

22. The multi-layered film according to claim 1, wherein the multi-layered film has two of the film layers containing the silver-colored pigments, or the two metallized outer layers, and two of the film layers containing the UV absorber.

23. The multi-layered film according to claim 1, further comprising an additional inner film layer containing a UV absorber and PE (polyethylene) or a PE mixture.

24. The multi-layered film according to claim 1, wherein the multi-layered film is laminated to an additional film or woven or non-woven material that includes a material absorbent for resin and liquids.

25. The multi-layered film according to claim 1, wherein the insert hose further comprises a hose-shaped, UV radiation-permeable inner film surrounded by the carrier system.

26. A multi-layered film formed as a hose-shaped outer film for an insert hose of a pipe rehabilitation system, comprising:
a plurality of film layers, wherein the film layers have one or more of:
(a) silver-colored pigments contained in at least two of the film layers;
(b) a metallization applied on both outer film layers of the multi-layer film; or
(c) silver-colored pigments contained in at least one film layer and a metallization applied on an outer film layer of the multi-layer film;
a UV absorber contained in at least one of the film layers; and
wherein a harmonization of the film layer thicknesses and an overall thickness of the multi-layer provides that the multi-layer film is permeable to UV light and visible light in a wavelength range from 200 to 800 nm at a rate of less than 0.1% and is perceived by a viewer as opaque, and that UV radiation and visible radiation is reflected in a wavelength range from 200 to 800 nm a rate of more than 20%;
wherein the UV absorber is selected from the group consisting of:
inorganic compounds, including metal oxides, which includes transition metal oxides such as titanium oxide, iron oxide and zinc oxide, along with metal oxide hydrates, which includes transition metal oxide hydrates;
organic compounds, including as benzotriazoles, triazines, benzophenones, and cyanoacrylates;
derivatives of the aforementioned compounds; and
mixtures of the aforementioned compounds; and
wherein the film layer containing the UV absorber contains at least one thermoplastic olefin homopolymer or copolymer and the silver-colored pigments.

27. A multi-layered film formed as a hose-shaped outer film for an insert hose of a pipe rehabilitation system, comprising:
a plurality of film layers, wherein the film layers have one or more of:
(a) silver-colored pigments contained in at least two of the film layers;
(b) a metallization applied on both outer film layers of the multi-layer film; or
(c) silver-colored pigments contained in at least one film layer and a metallization applied on an outer film layer of the multi-layer film;
a UV absorber contained in at least one of the film layers; and
wherein a harmonization of the film layer thicknesses and an overall thickness of the multi-layer provides that the multi-layer film is permeable to UV light and visible light in a wavelength range from 200 to 800 nm at a rate of less than 0.1% and is perceived by a viewer as opaque, and that UV radiation and visible radiation is reflected in a wavelength range from 200 to 800 nm a rate of more than 20%; and
wherein the film layers are symmetrical with at least one UV absorber film layer between two of the film layers containing the silver-colored pigments or between the metallized outer film layers.

* * * * *